US009848105B1

United States Patent
Fan

(10) Patent No.: US 9,848,105 B1
(45) Date of Patent: Dec. 19, 2017

(54) REDUCING SMEAR AND SLOW RESPONSE ARTIFACTS IN VECTOR ERROR DIFFUSION

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 09/080,700

(22) Filed: May 18, 1998

(51) Int. Cl.
*H04N 1/405* (2006.01)
*H04N 1/60* (2006.01)
*G06K 15/02* (2006.01)

(52) U.S. Cl.
CPC ....... *H04N 1/4052* (2013.01); *G06K 15/1881* (2013.01); *H04N 1/6027* (2013.01)

(58) Field of Classification Search
CPC ........ H04N 1/405; H04N 1/4052; H04N 1/60; H04N 1/6027; G06K 15/1878; G06K 15/1881
USPC ....... 382/252, 253, 251, 167, 162, 237, 270; 358/1.9, 518, 520, 534, 536, 535, 521, 358/456, 466, 458, 465
See application file for complete search history.

(56) References Cited

U.S. PATENT DOCUMENTS

| | | | | |
|---|---|---|---|---|
| 5,325,211 A | * | 6/1994 | Eschbach | 382/252 |
| 5,353,127 A | | 10/1994 | Shiau et al. | 358/458 |
| 5,432,893 A | * | 7/1995 | Blasubramanian | H04N 1/644 345/600 |
| 5,521,989 A | | 5/1996 | Fan | 382/252 |
| 5,621,545 A | * | 4/1997 | Motta | H04N 1/52 358/1.9 |
| 6,014,233 A | * | 1/2000 | Fan et al. | 382/253 |
| 6,062,137 A | * | 5/2000 | Guo | H04N 1/52 101/171 |

(Continued)

OTHER PUBLICATIONS

R. Floyd, et al., "An Adaptive Algorithm for Spatial Greyscale," *Proceeding of the S.I.D.*, (2nd qtr. 1976) Vo. 17, pp. 75-77.

(Continued)

*Primary Examiner* — Scott A Rogers
(74) *Attorney, Agent, or Firm* — Fay Sharpe LLP

(57) ABSTRACT

A method of color image processing for quantizing output includes obtaining an input for an object pixel which is represented by a vector in a first color space. A modified input equal to the input plus a sum of errors from other pixels in a neighborhood of the object pixel is generated. For each color component in the first color space, where corresponding color components of the modified input are located with respect to a preset range is determined. If the modified input's color component is greater than the preset range, then that color component for an output is determined to be on; if less than the preset range, then that color component for the output is determine to be off; and, if within the preset range, then that color component for the output is determined to be unknown. A transformed modified input is mapped to a perceptual color space when any color component of the output is unknown. Colors consistent with color components of the output that have already been determined are also mapped to the perceptual color space. The color in the perceptual color space that lies closest to the transformed modified input is chosen. An output in the first color space having color components on and off is generated consistent with the determinations and/or choices made. Error for the object pixel is then calculated as the difference between the output and the modified input.

13 Claims, 3 Drawing Sheets

(56) References Cited

U.S. PATENT DOCUMENTS

| | | | | |
|---|---|---|---|---|
| 6,072,591 | A * | 6/2000 | Harrington | 382/252 |
| 6,760,127 | B1 * | 7/2004 | Shin | H04N 1/52 |
| | | | | 358/3.03 |
| 7,626,729 | B2 * | 12/2009 | Fan | H04N 1/52 |
| | | | | 358/3.01 |
| 8,159,720 | B2 * | 4/2012 | Fan | H04N 1/4053 |
| | | | | 358/1.9 |

OTHER PUBLICATIONS

H. Haneishi, et al., "Color digital halftoning taking colorimetric color reproduction into account," *Journal of Electronic Imaging*, (Jan. 1996) vol. 5, pp. 97-106.

* cited by examiner

REDUCING SMEAR AND SLOW RESPONSE ARTIFACTS IN VECTOR ERROR DIFFUSION

BACKGROUND OF THE INVENTION

The present invention relates to the color image processing arts. It finds particular application in conjunction with color digital half-toning, and will be described with particular reference thereto. However, it is to be appreciated that the present invention is also amenable to other analogous applications.

Digital half-toning techniques are employed in image processing to simulate a continuous tone image with bi-level or otherwise quantized level devices. Examples of these techniques include fixed pattern, ordered dither, and error diffusion (ED). As well, for color applications such as ink jet printers and other digital color devices, color digital half-toning has been developed. Two such color digital half-toning techniques are scalar ED and vector ED.

In scalar ED, the different color components of the color image are separated out and processed monochromatically. That is to say, each color channel is processed independently as a one-dimensional ED problem. The quantized output for an object pixel is determined by comparing a modified input to a preset threshold. For a bi-level device this means that if the modified input was higher than the preset threshold the output would be high/on, if not the output would be low/off. The modified input represents an input value for the object pixel corresponding to the density of the color component being processed plus the sum of weighted quantization error from other quantized pixels in the neighborhood of the object pixel. The quantization error represents the difference between the quantized output and the modified input. In this manner, the error from the quantization of any one pixel is diffused to nearby surrounding pixels. Examples of such ED methods, are found in R. Floyd et al., "An Adaptive Algorithm for Spatial Greyscale," *Proceedings of the SID*, (2nd Quarter 1976), Vol. 17/2, pg. 75, U.S. Pat. No. 5,353,127 to Shiau et al. and U.S. Pat. No. 5,521,989 to Fan, both incorporated herein by reference. One drawback of scalar ED for color digital half-toning is that the technique is performed independently for each color component and the colorimetric color reproduction is not guaranteed.

Vector ED is similar to scalar ED. The difference is that in vector ED the pixels are represented by vectors in a chosen color space and an error is formulated as a multi-dimensional function. The different color components are not separately processed in a one-dimensional scalar manner. Moreover, the chosen color space is typically related to certain perceptual measures such that an output is generated which produces the least perception error. Generally, vector ED is superior to scalar ED with regard to visual noise level and achieves better reproduction quality. However, vector ED suffers from its own inherent drawbacks as pointed out by H. Haneishi et al. in "Color Digital Halftoning Taking Colorimetric Color Reproduction into Account," *Journal of Electronic Imaging*, (January 1996), Vol. 5(1), pg. 97. Vector ED tends to introduce artifacts at the leading and trailing edges of certain areas of color transitions. These artifacts have been termed slow response and smear respectively. Both the slow response and smear artifacts originate from the difference between the perceptual error and output error. In many instances, a minimum error in a perceptual space may imply a large error in an output device color space. Slow response results from a nonuniform distribution of primary colors. That is, contrary to ideal circumstances, not all the desired color components may initially participate in the reproduction resulting in slow response or a band of color without an ideal distribution. Smear results from the build up or accumulation of error being dumped into a second area upon a transition from a first area of a different color. In some cases, it can take many pixels to cancel the residual error that has built up. While the H. Haneishi et al. reference describes a technique for reduction of the smear artifact, it does not address or correct the slow response artifact.

The present invention contemplates a new and improved vector error diffusion technique which overcomes both the above-referenced slow response and smear problems and others.

SUMMARY OF THE INVENTION

In accordance with one aspect of the present invention, a method of quantizing pixels of a color image is provided. The method includes consecutively for each pixel summing an input for the pixel with error generated from other pixels in a neighborhood of the pixel to generate a modified input for the pixel. An output for the pixel is determined according to the following equations:

$$b(k) = \begin{cases} 1, & \text{for } i*(k) \geq 1.5 + d; \\ 0, & \text{for } i*(k) < -0.5 - d; \\ \text{undetermined}, & \text{for } -0.5 - d \leq i*(k) < 1.5 + d; \end{cases} \quad (1)$$

$$d \geq -1.0; \quad (2)$$

wherein k represents color components in a device color space, b(k) and i*(k) are the output and modified input respectively for the color component k, and d is a preset threshold. The output for the pixel is determined by applying vector quantization to the modified input when the output for a color component is undetermined from the foregoing equations 1 and 2. Colors corresponding to color components already determined are excluded from the vector quantization. An error is then generated for summing with successive inputs. The error is representative of a difference between the modified input and the output.

In accordance with another aspect of the present invention, a method of color digital half-toning is provided. The method includes reading data. The data includes data elements representing vectors in a device color space such that each vector corresponds to a picture element of a color image. Successively each of the data elements is processed. The processing includes modifying an object data element with an error term. The error term represents a sum of differences between prior modified data elements in a neighborhood of the object data element and corresponding quantized values of the prior modified data elements. Next the modified object data element is quantized. Scalar quantization is performed for components of the modified object data element that are outside a preset range, and vector quantization is performed for remaining components of the modified object data element not otherwise quantized. The components of the modified object data element correspond to color components in a device color space. Ultimately, the processed data is output in the device color space.

In accordance with another aspect of the present invention, a method of color image processing for quantizing output is provided. The method includes obtaining an input for an object pixel which is represented by a vector in a first color space. The input for the object pixel is modified. The modified input is equal to the input plus a sum of errors from other pixels in a neighborhood of the object pixel. For each color component in the first color space, where corresponding color components of the modified input are located with respect to a preset range is determined. If the modified input's color component is greater than the preset range, then that color component for an output is determined to be on. If the modified input's color component is less than the preset range, then that color component for the output is determine to be off. If the modified input's color component is within the preset range, then that color component for the output is determined to be unknown. A transformed modified input representing the modified input is mapped to a perceptual color space when any color component of the output is determined to be unknown. Colors consistent with color components of the output that have already been determined are mapped to the perceptual color space. The mapped color in the perceptual color space that lies geometrically closest to the transformed modified input is chosen and it is determined which color components for the output are to be on and off consistent with that choice. An output in the first color space having color components on and off consistent with the determinations made is generated. Error for the object pixel is then calculated as the difference between the output and the modified input.

One advantage of the present invention is its ability to process high quality color images.

Another advantage of the present invention is it permits error diffusion image processing with reduced visual noise levels.

Another advantage of the present invention is it permits error diffusion image processing with reduced smear and slow response artifacts.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
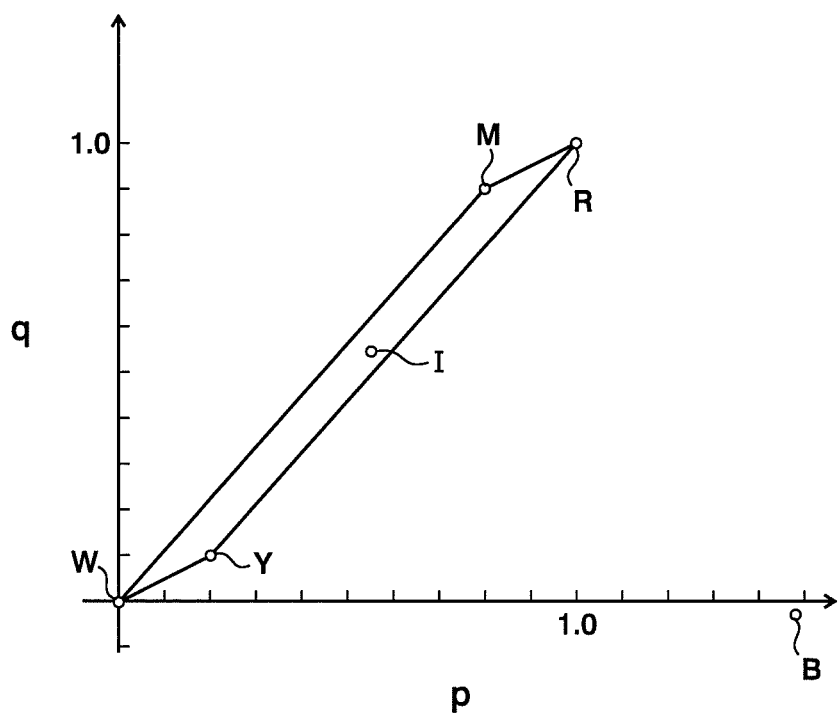
FIG. 1 is an illustration showing an example of a minimum error in perceptual space implying a large error in output device space.

As stated earlier, both slow response and smear artifacts originate from the differences between the perceptual error and output error. In many instances a minimum error in perceptual space may imply a large error in output device space. This is illustrated in FIG. 1 by a two ink example used in H. Haneishi et al. The input I is a constant wherein I=(yellow=0.55, magenta=0.54). A vector quantization is performed in a space p-q using Euclidean distances. The four output colors in p-q coordinates are W=(0, 0), Y=(0.2, 0.1), M=(0.8, 0.09), and R=(1, 1), respectively. The ideal output is evenly distributed Y, M, and R dots. However, assuming the initial errors are zero, the output is first oscillated between Y and M, since they are the closest points in p-q space. This results in two consequences. First, a band of a mixture of Y and M is generated when it should be a mixture of Y, M, and R. This is the slow response artifact. Secondly, the quantization error increases until it reaches an equilibrium point B, which is, in this example, roughly (p,q)=(1.5, −0.25), or equivalently, (yellow, magenta)= (15.5, −2). The large accumulation of error in yellow is later released when the input value changes and it causes smear. In this case, it introduces a band of yellow at least 15 pixels wide.

Figure 2:
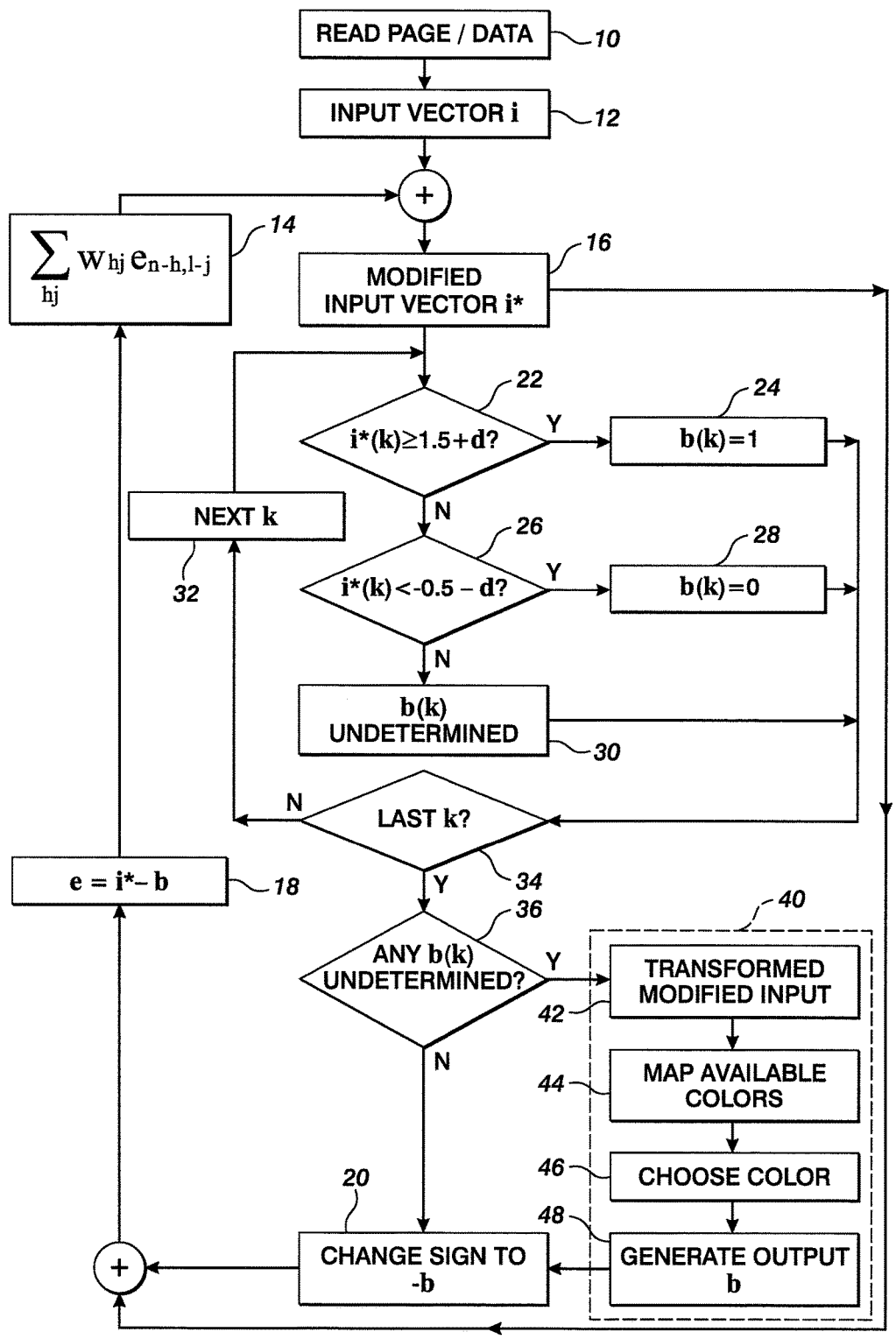
FIG. 2 is a flow chart illustrating a method of color image processing with error diffusion is accordance with aspects of the present invention; and, FIG. 3 is a diagrammatic illustration of an exemplary color space with modified input vector, and quantization error drawn therein, in accordance with aspects of the present invention.

Turning attention to FIG. 2, an input page or data composed of color images, graphics, text, and the like is optoelectrically or otherwise read 10 by a color copier, scanner, or other appropriate apparatus. The color image may be defined by an array of lines l each containing a number n of pixels or picture elements.

Figure 3:
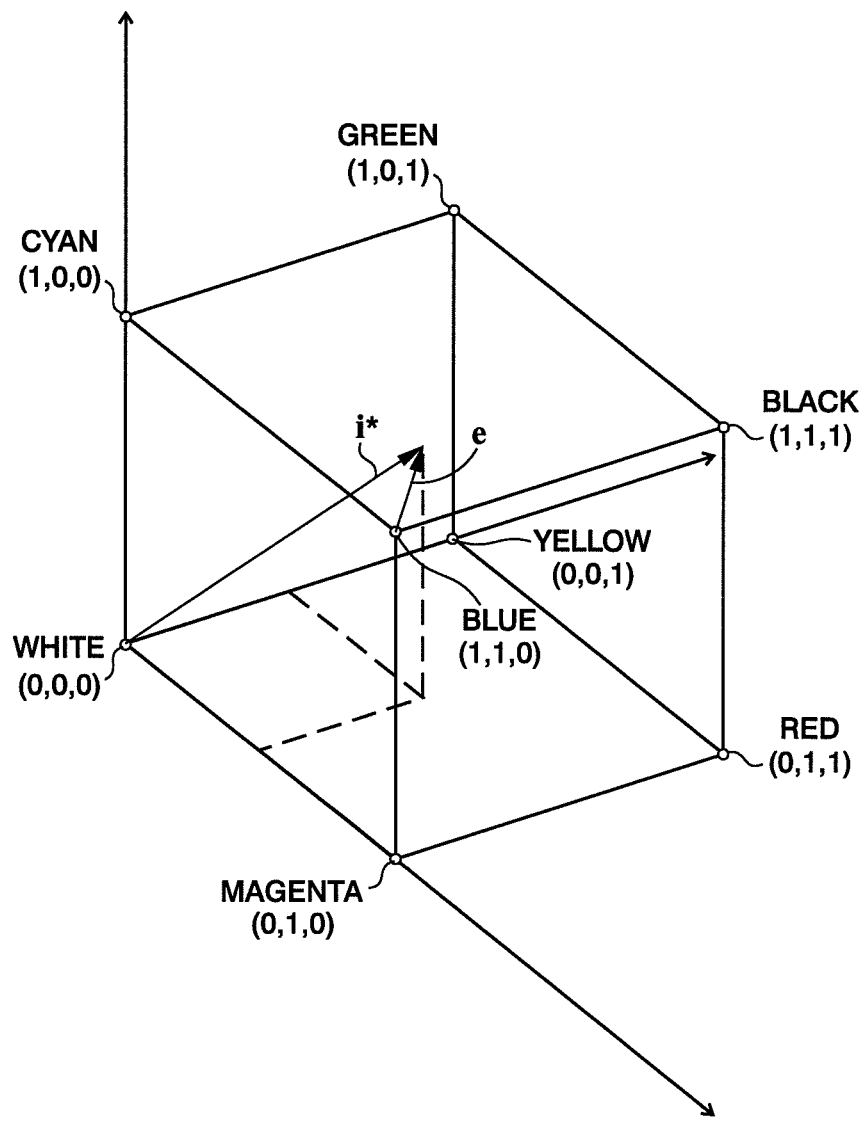

Each pixel in the image is expressed 12 as an input vector i in an appropriate device color space, such as for example a cyan-magenta-yellow (CMY) or red-green-blue (RGB) color space. The pixels are processed consecutively to generate a quantized output b for each pixel. In a bi-level device, the quantized output for each color component is 1 or 0 representing high/on or low/off respectively. In, for example, the CMY color space (see also FIG. 3), the possible output colors would then be white (cyan=0, magenta=0, yellow=0), cyan (1,0,0), magenta (0,1,0), yellow (0,0,1), black (1,1,1), blue (1,1,0), green (1,0,1), and red (0,1,1).

The input vector i of an object pixel is initially modified by an error term 14 to generate a modified input vector i* in the device color space 16. The error term 14 represents the error diffused to the object pixel from other pixels in the neighborhood of the object pixel. Initially, for the first pixel, no error has been generated because no other pixels have been quantized yet, and so the error is set to zero. Otherwise, the error term 14 is the weighted sum of D quantization error 18 gathered from other pixels in the neighborhood of the object pixel. The quantization error 18 generated by a pixel located at position n,l can be expressed as follows:

$$e_{n,l} = i_{n,l}^* - b_{n,l}$$

where $e_{n,l}$ is the quantization error 18 generated by the pixel, $i_{n,l}^*$ is the modified input. 16 for the pixel, and $-b_{n,l}$ is the negative quantized output 20 of the pixel.

The modified input 16 for a pixel at location n,l is calculated as follows:

$$i_{n,l}^* = i_{n,l} + \sum_{h,j} w_{h,j} e_{n-h,l-j}$$

where $i_{n,l}^*$ is the modified input 16 for the pixel, $i_{n,l}$ is the input 12 for the pixel, $$\sum_{h,j} w_{h,j} e_{n-h,l-j}$$

is the error term 14, $w_{h,j}$ are the weighting factors for the quantization errors $e_{n-h,l-j}$, and indices h and j define the neighborhood of pixels from which the quantization errors 18 are gathered. The weighting may be tailored to design preferences for various applications to obtain optimum performance and may take different forms as desired. The weighting depends on the spatial relationship between the pixel which generated the quantization error 18 and the pixel to which it is being diffused or transferred.

The quantized output b for each pixel is generated in two steps (Note, for the sake of convenience, the subscripts have been omitted). The first step involves checking, in the device color space, each of the color components of the modified input to determine where they lie in relationship to a preset range. The following formula is employed:

$$b(k) = \begin{cases} 1, & \text{for } i*(k) \geq 1.5 + d \\ 0, & \text{for } i*(k) < -0.5 - d \\ \text{undetermined}, & \text{for } -0.5 - d \leq i*(k) < 1.5 + d \end{cases}$$

where k represents the color components in the device color space, b(k) and i*(k) represent the output and modified input for color component k, and d represents a preset threshold where d≥−1.0. The threshold d controls the magnitude of the allowable output errors and thus also the smear and slow response artifact reduction. Generally, a value of d between −0.5 and 0.5 offers a desirable tradeoff between noise reduction and artifact reduction.

In a CMY device color space, k would consecutively represent the color components cyan, magenta, and yellow. Initially for example, the cyan color component of the modified input is checked to determine if it falls in the range defined by the preset threshold d. Assume for this example d=0, then at box 22 if the cyan color component of the modified input is greater than or equal to 1.5 the output cyan color component would be 1 or high/on 24. At box 26 if the cyan color component of the modified input is less than −0.5, then the output cyan color component would be 0 or low/off 28. Otherwise, the cyan color component of the modified input is less than 1.5 and greater than or equal to −0.5, and the output cyan color component would be undetermined 30. The process is then repeated 32 with the next color component k until all the color components are cycled through 34. When no output color components are left undetermined 36, then the output is simply generated consistent with the determinations made. On the other hand, when any output color component is left undetermined the second step is utilized. In this manner, scalar error diffusion is performed for color component of the modified input that fall outside the predetermined range.

The second step involves vector quantization 40. However, where one or two of the output components have previously been determined, the outcome of the vector quantization is limited to those colors consistent with the previous determinations. The vector quantization 40 takes place in a color space other than the device color space. Generally, it will be a perceptual color space, for example an LAB color space or the like, which emphasizes certain perceptual measures, such as intensity or the like, so that an output color is chosen which produces the smallest perception error. This perceptual color space may be askew or distorted in shape and may be non-linear. Depending on how many color components of the output were previously determined, the perceptual color space is effectively limited to one (in the case of two output color components already being determined) or two (in the case of one output color component already being determined) dimensions. For example, if only magenta were already determined in the first step, a two dimensional space is given with the available colors for step two being limited to, for magenta high/on, either magenta (0,1,0), red (0,1,1), black (1,1,1), or blue (1,1,0); and, for magenta low/off, either white (0,0,0), cyan (1,0,0), yellow (0,0,1), or green (1,0,1). Similarly, if for example the magenta component was determined to be 0 and the yellow component was determined to be 1 in the first step then the only available colors for the second step would be yellow (0,0,1) and green (1,0,1).

A projection or mapping of the modified input into the perceptual color space generates a transformed modified input 42 therein. The remaining available colors are also mapped in the perceptual color space 44. The color is then chosen 46 which lies geometrically closest to the transformed modified input in the perceptual color space. The output b is generated 48 in the device color space which is consistent with this color choice.

In this manner, color image half-toning, is achieved with less noise than scalar error diffusion while eliminating the slow response and smear artifacts of vector error diffusion. That is to say, the benefits of both error diffusion techniques are realized while limiting the drawbacks otherwise associated with either one. In operation, the technique herein generally calls for vector error diffusion. However, for each color component or separation, when the error goes out of bounds or generates a modified input that falls outside a predetermined range, the technique switches to scalar error diffusion so as to eliminate the carrying of arbitrarily large errors. Moreover, scalar error diffusion decisions that are made for one or more of the color components or separations are used to constrain the decisions made via vector error diffusion for the remaining color components or separations.

The invention has been described with reference to the preferred embodiments. Obviously, modifications and alterations will occur to others upon a reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of quantizing pixels of a color image, wherein consecutively for each pixel steps of the method comprise:
   summing an input for the pixel with error generated from other pixels in a neighborhood of the pixel to generate a modified input for the pixel;
   determining an output for the pixel according to equations 1 and 2;

$$b(k) = \begin{cases} 1, & \text{for } i*(k) \geq 1.5 + d; \\ 0, & \text{for } i*(k) < -0.5 - d; \\ \text{undetermined}, & \text{for } -0.5 - d \leq i*(k) < 1.5 + d; \end{cases} \quad (1)$$

$$d \geq -1.0; \quad (2)$$

wherein k represents color components in a device color space, b(k) and i*(k) are the output and modified input respectively for the color component k, and d is a preset threshold;
   determining the output for the pixel by applying vector quantization to the modified input when the output for a color component is undetermined from equations 1 and 2, wherein colors corresponding to color components already determined are excluded from the vector quantization; and generating error for summing with successive inputs, the error representative of a difference between the modified input and the output, wherein a color image is rendered based on the determined output for each pixel.

2. The method according to claim 1, wherein the preset threshold d is greater than −0.5 and less than 0.5.

3. The method of claim 1, wherein the error generated from other pixels in a neighborhood of the pixel is weighted based on the other pixels spatial relationship with the pixel.

4. The method of claim 1, wherein the vector quantization is performed in a color space other than the device color space.

5. A method of color digital half-toning, the steps comprising:
(a) reading data, the data including data elements representing vectors in a device color space such that each vector corresponds to a picture element of a color image;
(b) successively processing each of the data elements, wherein the process includes;
   (i) modifying an object data element with an error term, the error term representing a sum of differences between prior modified data elements in a neighborhood of the object data element and corresponding quantized values of the prior modified data elements;
   (ii) quantizing the modified object data element, such that scalar quantization is performed for components of the modified object data element that are outside a preset range and vector quantization is performed for remaining components of the modified object data element not otherwise quantized, wherein the components of the modified object data element correspond to color components in a device color space;
(c) outputting the processed data in the device color space; and
(d) rendering a color image based on the output processed data.

6. The method of claim 5, wherein the vector quantization is performed in a color space other than the device color space.

7. The method of claim 6, wherein the device color space is one of a cyan-magenta-yellow color space and a red-green-blue color space.

8. A method of color image processing for quantizing output comprising:
(a) obtaining an input for an object pixel which is represented by a vector in a first color space;
(b) modifying the input for the object pixel, the modified input being equal to the input plus a sum of errors from other pixels in a neighborhood of the object pixel;
(c) for each color component in the first color space, determining where corresponding color components of the modified input are located with respect to a preset range;
   (i) if the modified input's color component is greater than the preset range, then that color component for an output is determined to be on;
   (ii) if the modified input's color component is less than the preset range, then that color component for the output is determine to be off; and,
   (iii) if the modified input's, color component is within the preset range, then that color component for the output is determined to be unknown;
(d) mapping to a perceptual color space a transformed modified input representing the modified input when any color component of the output is determined to be unknown;
(e) mapping to the perceptual color space colors consistent with color components of the output that have already been determined; and,
(f) choosing the mapped color in the perceptual color space that lies geometrically closest to the transformed modified input and determining which color components for the output are to be on and off consistent with that choice;
(g) generating an output in the first color space having color components on and off consistent with the determinations made;
(h) calculating error for the object pixel as the difference between the output and the modified input; and
(i) rendering a color image based on the processed color image.

9. The method of claim 8, wherein the first color space is one of a cyan-magenta-yellow color space and a red-green-blue color space.

10. The method of claim 8, wherein the sum of errors in step (b) is a sum of weighted errors calculated in step (h), the weighting being determined based on a spatial relationship between the object pixel and the other pixel from which the error came.

11. A color image processor for quantizing output colors comprising:
an input device which reads in a number of pixels as input vectors in a device color space;
a modifier which combines input vectors with error terms to generate modified input vectors, wherein the error terms represent quantization error from previously quantized pixels;
a quantization processor which applies vector error diffusion to components of the modified input vectors which fall within a predetermined range of values and applies scalar error diffusion to components of the modified input vector which fall outside the predetermined range of values such that quantized output vectors are generated thereby; and,
an output device which generates quantized color outputs in the device color space consistent with the quantized output vectors generated by the quantization processor, wherein a color image is rendered based on the quantized color outputs.

12. The color image processor of claim 11, wherein the quantization processor applies the vector error diffusion in a perceptual color space which is different than the device color space.

13. The color image processor of claim 12, wherein the vector error diffusion is constrained to outcomes consistent with the scalar error diffusion.

* * * * *